May 14, 1946. E. PORTER 2,400,132
AMPHIBIAN VEHICLE
Filed Oct. 2, 1943 5 Sheets-Sheet 1

Inventor
Edward Porter
By Wilfred E. Lawson
Attorney

May 14, 1946. E. PORTER 2,400,132
AMPHIBIAN VEHICLE
Filed Oct. 2, 1943 5 Sheets-Sheet 4

Inventor
Edward Porter
By Wilfred E. Lawson
Attorney

May 14, 1946.  E. PORTER  2,400,132
AMPHIBIAN VEHICLE
Filed Oct. 2, 1943   5 Sheets-Sheet 5
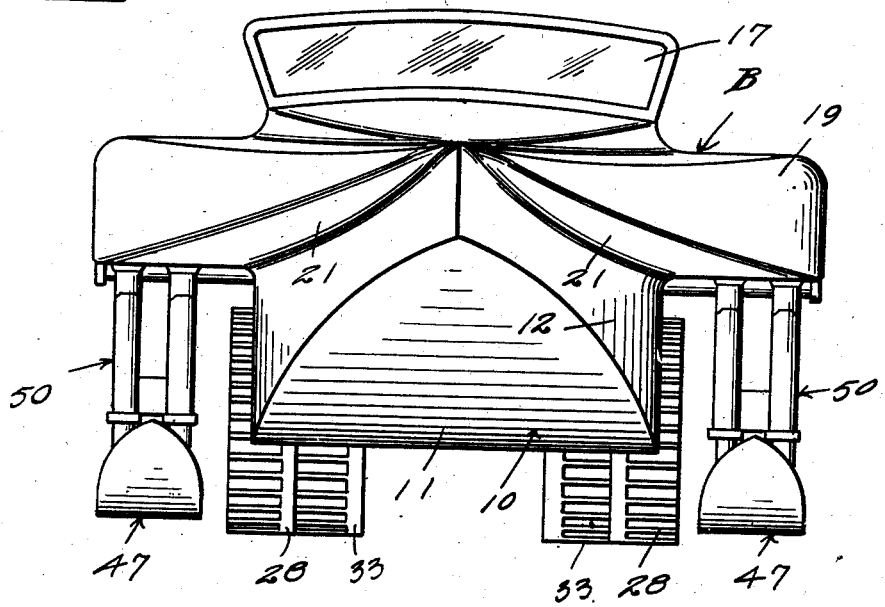
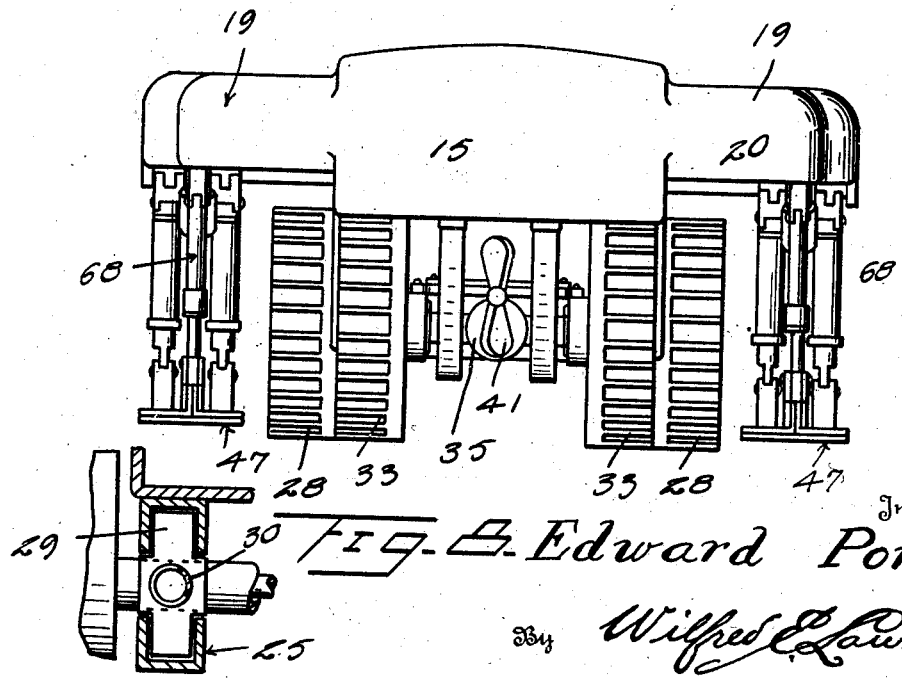
Inventor
Edward Porter
By Wilfred E. Lawson
Attorney Patented May 14, 1946

2,400,132

UNITED STATES PATENT OFFICE 2,400,132

AMPHIBIAN VEHICLE

Edward Porter, Akron, Ohio, assignor of two-twentieths to Alvin W. Larson, Akron, Ohio Application October 2, 1943, Serial No. 504,770

14 Claims. (Cl. 115—1)

This invention relates generally to the class of vehicles or conveyances and has to do particularly with improvements in amphibian vehicles.

A principal object of the present invention is to provide a novel construction of amphibian vehicle which is designed not only with a view to operating upon land as well as upon the water but for operation over snow and ice as well as directly in contact with the earth, regardless of whether the snow is of firm and hard packed character or soft and mushy.

A further object of the invention is to provide a vehicle of the above described character having a novel construction providing sled or runner like wings which function to not only support the structure in soft mushy snow but provide a sled surface whereby the forward movement of the vehicle in this particular type of snow may be maintained.

Still another object of the invention is to provide an amphibian vehicle having both supporting wheels and runners or ski-like supports which have a cooperative action to effect the forward progression of the vehicle and in which such runners are retractable so that the vehicle can be operated in the nature of an ordinary pneumatic tired vehicle over dry land.

A further object of the invention is to provide a vehicle of the character stated having cooperating supporting wheels and runners designed for simultaneous contact with snowy surfaces whereby the wheels effect the forward movement of the vehicle on the runners and wherein the rear wheels of the vehicle are employed for steering the same.

Other objects and advantages of the invention will become apparent as the description of the same proceeds and the invention will be best understood from a consideration of the following detailed description taken with the accompanying drawings with the understanding that minor changes or alterations may be made in the structure so long as such changes or alterations form no material departure from the salient features of the invention as expressed in the appended claims.

In the drawings:

Figure 6 is a view in front elevation of the vehicle.

Figure 7 is a view in rear elevation of the vehicle.

Figure 8 is a horizontal detailed section taken on the line 8—8 of Figure 5.

Figure 9 is a detailed view illustrating conventionally a form of mechanism which may be employed for establishing a driving connection between the power plant of the vehicle and the propeller.

Figure 10 is a longitudinal section through a portion of the fluid operated lifting jack for a runner.

Figure 11 is a detailed view on an enlarged scale, partly in longitudinal section, of a shock absorbing leg connecting the body of the vehicle with a runner.

Figure 1:
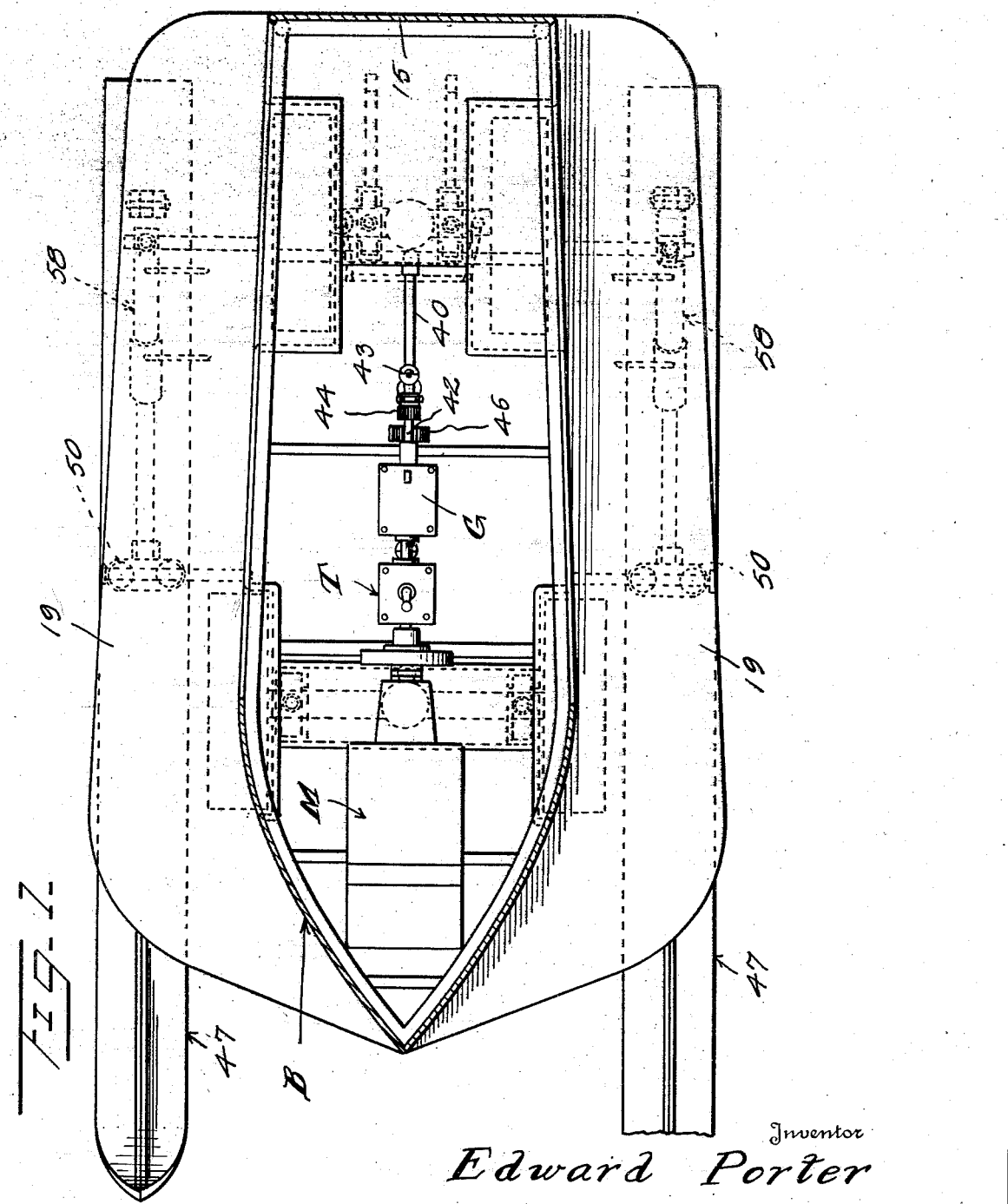
Figure 1 is a view in top plan of a vehicle constructed in accordance with the present invention, parts of standard features of the structure being conventionally illustrated.

Referring now more particularly to the drawings, wherein like numerals of reference designate corresponding parts throughout several views, the body of the present vehicle is generally designated B. This body is in the form generally of an open top boat and is of water-proof or water-tight construction as it is designed to travel on the water, as well as upon land.

In accordance with the present invention the body B has a central boat shaped portion 10, the bottom 11 of which curves upwardly to a point or bow at the forward end. The side walls of this central portion of the body are designated 12 and curve inwardly to meet the point at the bow in the general form of a flat bottom boat.

At the rear or stern of the body the bottom 11 merges with the short vertical wall 13 which is continued rearwardly at its top by the horizontal counter 14. The straight stern wall which extends upwardly and curves slightly forwardly from the rear end of the counter 14 is indicated by the reference character 15 while the deck at the bow end of the structure is designated 16, it being finished off at its rear by the upstanding windshield or deflector 17 which is at the forward end of the well 18.

Each side of the central portion 10 of the vehicle body is bordered by the relatively wide laterally extending wings 19. Each of these wings at its forward end curves inwardly to meet the point or bow of the body proper and each wing extends the full length of the vehicle as is clearly shown in Figure 1.

The laterally extending wing portions 19 are, as is clearly shown in Figures 6 and 7, of materially less height or depth than the body 10 and each provides a flat under bearing face or surface 20 which is straight throughout the major portion of the length of the wing, curving upwardly and inwardly only at the front end of the wing and substantially in conformity with the upward curvature of the bottom 11, as indicated at 21. Thus it will be seen that the under faces 20 and 21 of the wings form sled surfaces which, when the vehicle is travelling in the water, will move over the surface of the water and, when the vehicle is moving over deep snow, where the body portion may sink down, will engage the surface of the snow at the two sides of the body proper and thus keep the body from sinking further. These wing portions 19 also function as supporting means for the hereinafter described runners or ski and as a covering or shielding means for such parts of the structure.

Within the vehicle structure at the bow end thereof is mounted a suitable type of motor which is generally designated M, with the drive shaft of which is operatively coupled according to well-known motor vehicle construction a transmission mechanism which is generally designated T. Rearwardly of the transmission mechanism is located the reduction gearing of any suitable construction, which is generally designated G, through which extends, on the longitudinal center of the vehicle, to project forwardly and rearwardly from the mechanism, the power take off shaft 22. No detailed illustration of the transmission mechanism or the reduction mechanism G is believed to be necessary since these units are of well known design and, in themselves, form no part of the present invention. The connection between the gear reduction mechanism G and the vehicle wheels and propeller will be hereinafter more specifically set forth.

At the forward end of the vehicle structure each of the side walls 12 has a wheel recess 23 formed therein and extending transversely of the body is a chamber 24 which opens at each end in a wheel recess.

At each end of the transverse chamber 24 there is secured a pair of spaced vertical guides 25 which, as shown in Figure 8, consist of two channel members having the channel sides in opposed relation.

Figure 5:
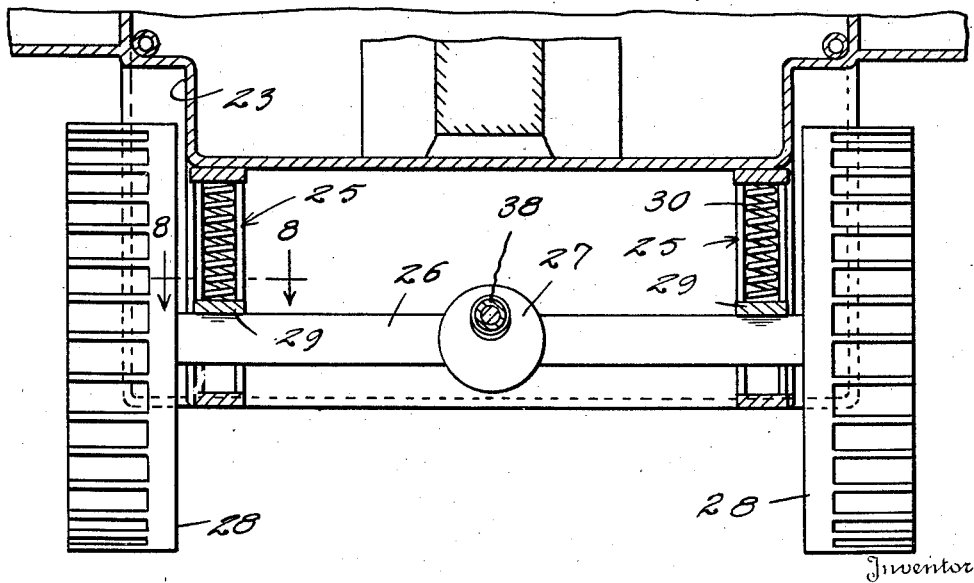
Figure 5 is a section taken transversely of the central portion of the vehicle substantially on the line 5—5 of Figure 3.

Extending transversely of the body through the chamber 24 is an axle housing 26 at the center of which is a differential casing 27. This housing encloses the usual axles, not shown, for front wheels 28 which are located within or partially within the recesses 23 as shown in Figure 5. The ends of the axle housing 26 extend, of course, through the vertical bearing guides 25 and are designed to have vertical movement in these guides.

Within each guide 25 is slidably mounted a plate 29 which rests upon the axle housing 26 and interposed between this plate and the top of the guide is a spring 30 which constantly resists the upward movement of the housing in the guide and which functions as a spring support for the vehicle body upon the axle.

Figure 4:
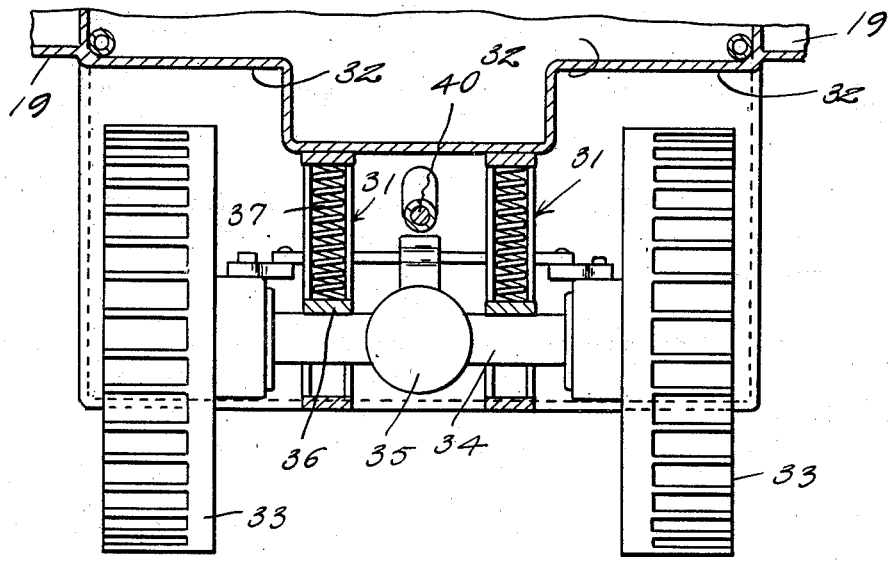
Figure 4 is a transverse section through the central part of the vehicle substantially on the line 4—4 of Figure 3.

At the rear end of the vehicle under the counter 14 and disposed preferably against the vertical wall 13, adjacent each side of the vehicle, is a pair of spaced vertical guides 31 of the same form as the guides 25 and the bottom 11 of the vehicle body, adjacent each of these guides 31, is formed to provide a recess 32 to receive the upper portion of a supporting wheel 33. These wheels are carried upon axles, not shown, extending through the housing 34 which passes through the guides 31 as shown in Figure 4 and the central part of this housing is formed to provide a differential casing 35 within which, as in the casing 27 also, is enclosed a standard type of differential mechanism. Within each of the rear guides 31 is slidably mounted a bearing plate 36 between which and the top of the guide is interposed a spring 37 which, like the spring 30 acts as a cushion and a supporting means for the rear end of the body, upon the rear axle housing.

As is shown in Figure 1 the rear wheels 33 are set closer together than the front wheels 28 so that the rear wheels will not track the front ones and, as both the front and rear wheels are driven, better traction will be obtained on land or when travelling over snow, the wheels having suitable cleated treads designed to obtain the maximum hold in soft ground, snow or the like. While the paths of the front and rear wheels are offset, the wheels are so placed that the path formed by each rear wheel will join that formed by the adjacent front wheel so that the paths will be merged, thereby forming or breaking a relatively wide path or trail.

The rear wheels 33 are mounted for turning on vertical axes so that by controlling these rear wheels steering of the vehicle may be readily accomplished.

Figure 3:
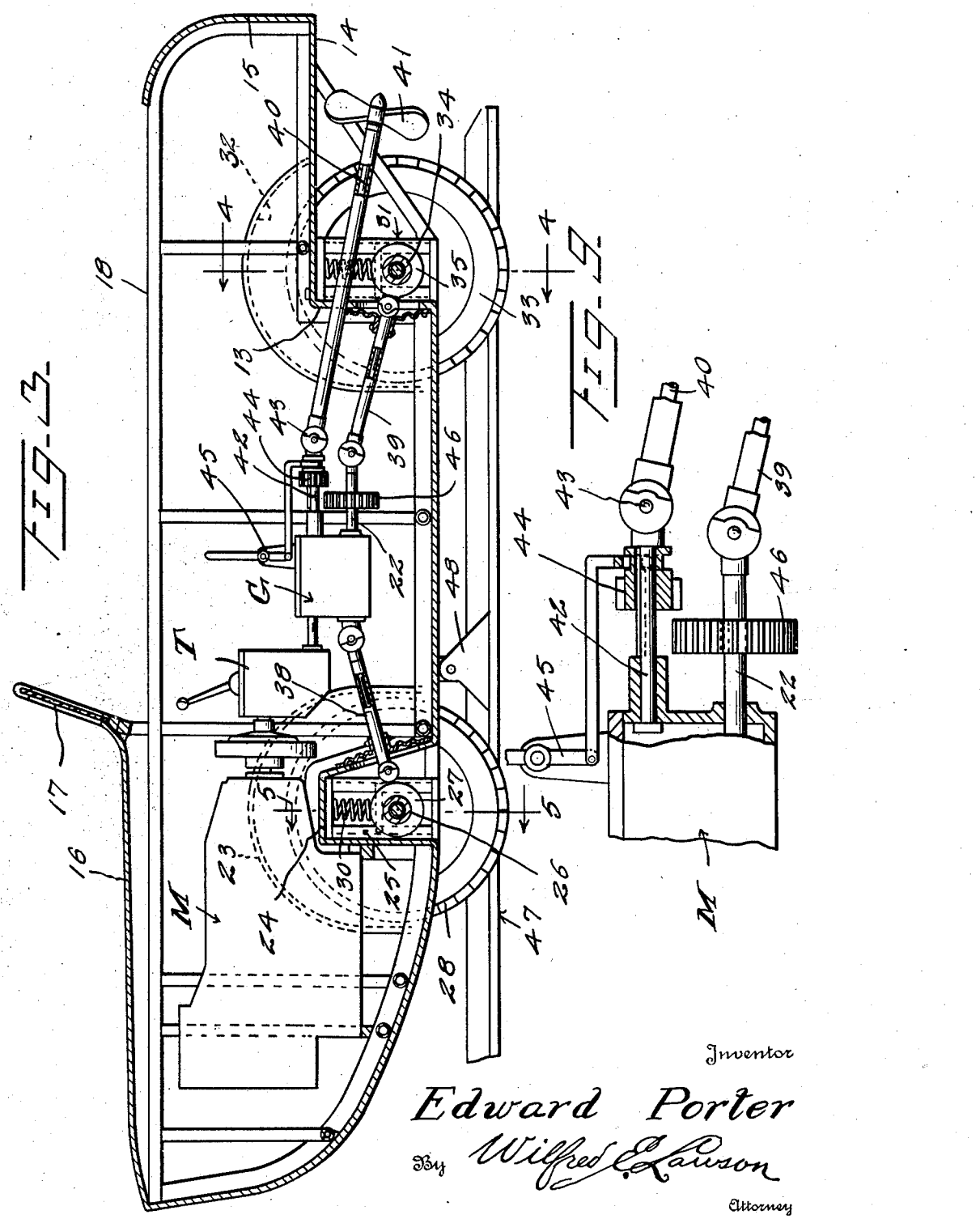
Figure 3 is a substantially central longitudinal section of the vehicle.

Extending forwardly and rearwardly from the gear reduction mechanism G are driven shafts 38 and 39 respectively, each of which is connected to an end of the power shaft 22 as shown in Figure 3 and the forward shaft 38 connects with the differential mechanism in the forward housing 27 while the rear shaft 39 connects with the differential mechanism in the rear housing 35. By this means the desired driving power may be transmitted from the power plant or motor M to the front and rear wheels.

Extending through the rear wall portion 13 of the bottom is a drive shaft 40 which terminates at its rear end under the counter 14 and supports thereunder the screw 41 which is designed to propel the vehicle forward when the vehicle is in the water. The forward end of the propeller shaft 40 has connected therewith a suitable mechanism for establishing a driving connection with the shaft 22. Such mechanism is here illustrated as comprising a rotatable stub shaft 42 supported for free rotation and connected by the universal coupling 43 with the rear of the propeller shaft 40. On this stub shaft is slidably mounted the pinion gear 44 with which is operatively connected means 45 for shifting it forwardly and rearwardly as desired. Upon the power shaft 22 beneath the stub shaft 42, is fixed a spur gear 46 with which the pinion 44 is adapted to have sliding connection. With this arrangement it will be readily seen that upon suitably actuating the control 45 the pinion 44 may be shifted forwardly into toothed connection with the gear 46 so as to transmit rotary motion from the shaft 22 to the propeller screw shaft 40.

Disposed beneath each wing portion 19 outside the adjacent pair of wheels is a supporting runner or ski which is generally designated 47. Each ski is of an overall length equal to or slightly greater than the length of the vehicle.

Mounted upon the top of each ski adjacent to the forward or front wheel 28 is a bearing shoe 48 carrying a pair of upstanding apertured ears 49 one only of which is shown. These ears are spaced apart transversely of the ski.

Each shoe 48 has connected therewith a pair of legs each of which is indicated by the numeral 50. Each leg comprises an upper tubular portion 51 and a lower post 52 which extends into the open lower end of the tubular portion 51 and carries a piston-like head 53 which slides in the tubular portion but is resisted in its movement thereinto by the cushion spring 54 which is housed within the tube. The lower end of each post 52 is pivotally connected by a pivot pin 55 with an ear 49.

Figure 2:
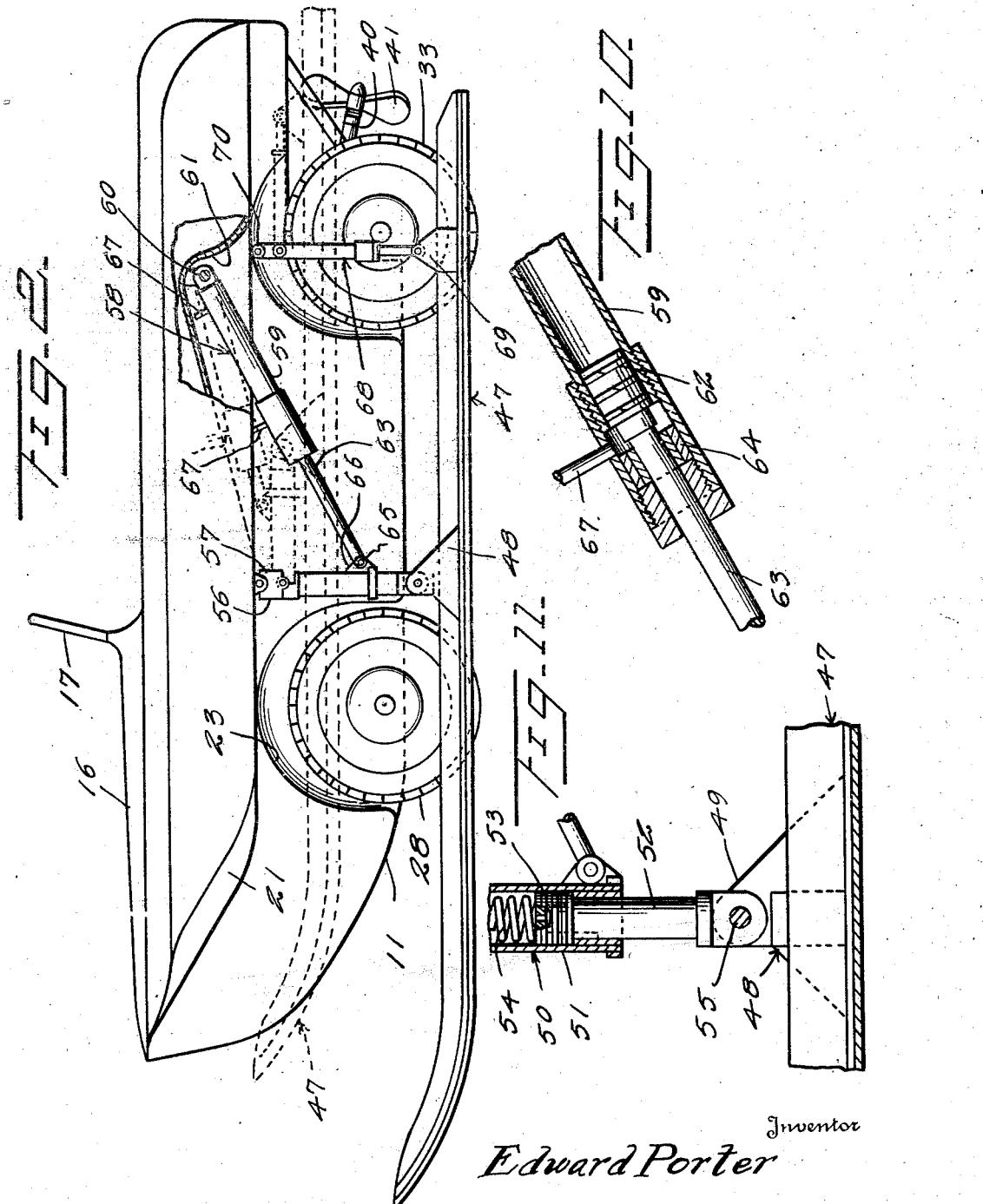
Figure 2 is a view in side elevation of the same showing the ski runners lowered, parts of the structure being broken away.

At the upper end of each leg, the tube thereof is attached by a hinge 56 with a knee post 57 which is secured in a suitable manner, to the underside of the adjacent wing 19 as shown in Figure 2. The hinge 56 is of well known rule type whereby the rearward and upward swinging movement of the leg is permitted to lift the ski but the downward and forward movement is checked by the hinge when the leg assumes a vertical position as shown in Figure 2.

As is also clearly shown in Figure 2 the pair of legs for the ski has connected therewith a fluid operated jack generally designated 58, by means of which the raising and lowering of the ski is effected. Each jack comprises a power cylinder 59 which is pivotally attached as at 60, at its upper end, to the overlying wing, in a suitable downwardly opening recess 61 in the underside of the wing, into which the major portion of the jack swings when the ski is lifted.

Slidable in the jack cylinder 59 is a piston 62 having a rod 63 which extends downwardly through the open lower end of the cylinder, through a suitable fluid tight packing 64, and is pivotally attached as at 65, to the adjacent pair of legs 50, by an ear or coupling 66 which is secured centrally between the lower ends of the adjacent cylinders 51.

Each end of the jack cylinder 59 has connected therewith a tube or pipe 67. These pipes are connected with a suitable fluid pump, not shown, by means of which fluid may be injected into either end of the cylinder and simultaneously withdrawn from the opposite end so as to effect the desired inward or outward movement of the piston 62.

Rearwardly of each pair of legs 50 there is disposed upon the longitudnal center of the ski, an auxiliary leg 68 which may be of the same general construction as a leg 50 and which is pivotally attached at its lower end to the ski by means of the attaching ear 69 while its upper end is pivotally secured to the underside of the overlying wing as indicated at 70.

In actual practice it is preferred that the low points of the wheels be disposed slightly below the bottoms of the two skis, as shown in Figures 2 and 6 so that when the skis are lowered for travelling over ice or snow a positive gripping engagement will be obtained between the treads of the wheels and the underlying surface upon which the skis are sliding.

When the vehicle is operated on dry land or in the water the ski will be retracted and raised to a position in relatively close proximity to the undersides of the wings 19 as indicated in dotted outline in Figure 2. At such time, if the vehicle is operating in water, a connection will be established between the screw propeller shaft 40 and the shaft 22 to effect the forward movement of the vehicle by the screw and guiding or steering of the vehicle will be by means of the rear wheels which will function as rudders in the water.

When the vehicle is running over snow, if it runs into light or soft snow so that the body portion 10 sinks down thereinto, the under faces of the wing portions 19 will coact with the raised ski to form runner or sledding surfaces which will prevent the vehicle sinking deeper into the snow and continued forward movement can be maintained by the cleated wheels, as will be readily apparent.

It will be noted that the overall width of the vehicle at the front is greater than the distance between the outer edges of the skis. By this arrangement protection is afforded the ski against damage in the event that the vehicle strikes another object or is sideswiped by another vehicle.

It is also to be pointed out that the bottom of the main body portion and of each wing curves upwardly at the forward end so that the body and each wing functions in the nature of a runner when sliding over snow.

I claim:

1. An amphibian vehicle comprising a body of water-tight construction, having a central portion and laterally projecting longitudinally extending wing portions the bottoms of which are in a plane a substantial distance above the bottom of the central portion, supporting wheels for the body, means for transmitting driving power to the supporting wheels, a ski disposed longitudinally of the body upon each side of the central portion thereof and beneath said wings, and means connecting the ski with the wings for raising and lowering of the ski, the ski when raised lying entirely above the bottom of said central portion.

2. An amphibian vehicle as set forth in claim 1 in which the wheels are arranged in front and rear pairs with the wheels of the rear pair arranged to travel along paths offset with respect to but joining the paths of the front wheels.

3. An amphibian vehicle comprising a body of boat-like form, laterally projecting wings extending longitudinally throughout the length of the body upon each side thereof, said wings having under surfaces in a common horizontal plane a substantial distance above the bottom of the body, front and rear pairs of supporting wheels for the body, power means for driving the rear wheels, a screw propeller shaft extending from the rear of the vehicle body, a screw propeller upon the rear end of said shaft, means for establishing an operative coupling between said shaft and said driving means, and said rear wheels being supported for turning to effect steering of the vehicle thereby on land and in the water.

4. An amphibian vehicle as set forth in claim 3 in which the wheels of the rear pair are set inside the paths of travel for the wheels of the front pair whereby the wheels of the front and rear pairs are out of tracking relation.

5. An amphibian vehicle of the character described comprising a body, laterally projecting wings disposed upon opposite sides of the body and extending throughout the length thereof, said wings having under surfaces in a common plane transversely of the body and in a plane a substantial distance above the bottom of the body, said body having front and rear wheel recesses in the sides thereof beneath and at the inner sides of the wings, the body having a transverse bottom channel connecting the front recesses, axles extending transversely of the body at the front and rear, the front axle being disposed in said transverse channel, the axles terminating at their ends in the recesses, wheels disposed within the recesses and connected with said axles, means supporting the axles for limited up and down movement, means for transmitting driving power to the wheels through said axles, a ski disposed lengthwise of each side of the body beneath the adjacent wing, pivoted supporting legs connecting each ski with the overlying wing, and means for effecting the swinging of the legs for the raising and lowering of the ski.

6. A vehicle as set forth in claim 5 wherein the said supporting means for the axles comprises vertical channeled guides and a spring enclosed in each guide above and bearing down upon the underlying axle.

7. An amphibian vehicle as set forth in claim 5 with a screw propeller drive shaft extending rearwardly from within the vehicle to the exterior thereof, a screw propeller upon the rear end of said shaft, and means for establishing a driving connection between the screw propeller shaft and the wheel driving means, and means for steering the vehicle.

8. An amphibian vehicle as set forth in claim 5, with a screw propeller shaft extending rearwardly from within the vehicle to the exterior thereof, a screw propeller upon the rear end of the shaft, means for establishing a driving connection between the propeller shaft and the wheel driving means, and said rear wheels being steerable for controlling the direction of movement of the vehicle on land and in the water.

9. An amphibian vehicle as set forth in claim 5 in which said leg swinging means comprises a fluid powered jack coupled between a leg and the adjacent overlying wing.

10. An amphibian vehicle of the character stated comprising a body having a center longitudinally extending portion and side portions having bottom surfaces lying above the plane of the bottom surface of the center portion and designed to give support to the bottom in snow and in water, supporting wheels carried by the center portion of the body, a ski carried at each side of the center portion, means for lifting each ski to position beneath the bottom of the adjacent side portion and at the side of the center portion, and means for steering the vehicle.

11. An amphibian vehicle as set forth in claim 10, in which the bottom of said center portion at the front of the body and the bottom of each wing at the forward end thereof is curved upwardly.

12. An amphibian vehicle as set forth in claim 10, in which the bottom of said center portion at the front of the body is tapered to a point at the front end and is curved upwardly at the front end.

13. An amphibian vehicle as set forth in claim 10, in which said side portions project laterally beyond the side of the underlying ski and function to protect the ski from being struck by objects at the sides of the vehicle.

14. An amphibian vehicle comprising a body of water-tight construction, having laterally projecting longitudinally extending wing portions, supporting wheels for the body, means for transmitting driving power to the supporting wheels, a ski disposed longitudinally of the body upon each side thereof and beneath said wings, means connecting the ski with the wings for raising and lowering of the ski, said wheels being arranged in front and rear pairs, the wheels of one pair being set farther apart than the wheels of the other pair whereby the wheels will be out of tracking relation, and means for turning the wheels of the rear pair for steering the vehicle.

EDWARD PORTER.